United States Patent
Paulson

[19]
[11] Patent Number: 6,032,804
[45] Date of Patent: Mar. 7, 2000

[54] CYCLONIC DUST COLLECTOR

[76] Inventor: Jerome I Paulson, 554 Owl Bridge Rd., Washington Boro, Pa. 17582

[21] Appl. No.: 08/876,654

[22] Filed: Jun. 16, 1997

[51] Int. Cl.$^7$ .............................. B07B 7/00; B01D 45/00
[52] U.S. Cl. ........................ 209/148; 209/143; 209/710; 55/406; 55/408
[58] Field of Search .................................. 209/133, 142, 209/143, 147, 148, 710; 55/398, 401, 404, 405, 406, 408

[56] References Cited

U.S. PATENT DOCUMENTS

| | | | |
|---|---|---|---|
| 4,220,457 | 9/1980 | Fredriksen | 55/273 |
| 4,296,864 | 10/1981 | Misaka et al. | 209/148 X |
| 4,604,192 | 8/1986 | Yamada et al. | 209/148 X |
| 4,631,124 | 12/1986 | Paulson | 209/3 |
| 4,840,645 | 6/1989 | Woodworth et al. | 55/406 X |
| 5,562,366 | 10/1996 | Paulson | 406/12 |

OTHER PUBLICATIONS

Operation and Maintenance Manual Pulse–Jet Dust Collectors C.P Environmental Filters Inc.
TubeJet Dust Collector W.W. Sly Manufacxturing Company.
WR Series Welded Pulse Jet Dust Collectors Flex Kleen A Research–Cottrell Company.
Day Model PJD Dust Collectors Donaldson Company, Inc.
AAF Millennium AAF International.

*Primary Examiner*—Tuan N. Nguyen
*Attorney, Agent, or Firm*—Russell J. Egan

[57] ABSTRACT

A method and apparatus for collecting and removing dust from dust laden air has a housing defining a chamber having an inlet for the dust laden air, a first outlet for dust free air and a second outlet for the collected dust, the inlet and second outlet being connected by a curved wall. A filter cartridge is mounted in the chamber at the axis of the curved wall and is at least partially enclosed within and inner wall which, together with the outer wall forms a cyclonic passage for the air passing therethrough. High velocity air flow is directed into the chamber wherein at least some of the dust will strike the chamber wall at high velocity causing a rapid change in kinetic energy and detraining the dust from the air, this dust then falling from the air stream and removed from the chamber through an air lock or similar device. The air then revolves around and is drawn through the filter removing the remaining dust therefrom. Periodically, bursts of reverse flow air are sent through segments of the filter to cause dust lodged therein to be reentrained in the flowing air and carried to the dust exit.

52 Claims, 3 Drawing Sheets

CYCLONIC DUST COLLECTOR

BACKGROUND OF THE INVENTION

1. The Field of the Invention

The present invention relates to a method and apparatus for removing dust entrained in an air stream and, in particular, to a method and apparatus utilizing a unique cyclonic air flow, coupled with an improved filter assembly, to remove substantially all particles from the air stream while achieving long filter life, great savings in space and reduced capital and maintenance costs.

2. The Prior Art

The present invention is a dust collector of the type which can most advantageously be used with devices which use air flows to remove dust and debris from product, such as the deduster devices described in my U.S. Pat. Nos. 4,299,693 and 4,631,124, the disclosures of which are incorporated herein by reference. My earlier devices employ gravity to feed the dust and impurity laden particulate material through a linear kinetic energy cell, which cell generates an electric field to neutralize the static electrical charges, which is what causes the dust to adhere to the particulate material. With the static charge neutralized, the dust can be separated by an air flow substantially transverse to the path of the flow of particulate material. This cleaning or separation can be accomplished by using a pressurized air stream or a vacuum. However, this process, while cleaning the product, results in the creation of a volume of air heavily laden with dust an debris, much of which is extremely small in size. However, it should be noted that the present invention is a stand alone device completely separate from the dedusters covered by the above mentioned U.S. Pat. Nos. 4,299,693 and 4,631,124.

The present invention provides means to collect dust and debris from an air stream, regardless of the source of the dust and debris, and to remove that dust and debris from the carrier air. Thus only substantially clean air will be released into the environment and the dust and debris previously entrained therein will collected for proper disposal or recycling.

A traditional dust collector would be difficult to locate indoors when large air volumes are to be handled. As an example, in order to clean a dusty 5,000 cu ft. stream of air, a traditional dust collector would require at least 1,000 sq. ft. of cloth filter surface and a housing approximately 6 ft. sq. and 20 ft tall. In comparison, the housing for a cyclonic dust filter according to the present invention would be approximately 3 ft sq. by 6 ft tall, depending on the style of dust discharge.

The traditional dust collector contains at least 120 filter bags which need to be serviced periodically. This task requires approximately two days of work for a crew of three, in other words, about forty eight work hours, during which time the dust collector is in a down conditionIn comparison, the subject cyclonic dust filter has a single cartridge which can be changed by a single worker in about five minutes.

Development of reverse pulse dust collectors, which use periodic reverse air pulses to clean filters, has stabilized in recent years with the use of filter bags and, more recently, with cartridge style filter units. Due to their compact size, the cartridge style filter has become very attractive to plant operators. Its ease of installation and the large filtering area provided by the filter cartridges have presented strong incentives for their use. By utilization of standard reverse pulse hardware, the filter cleaning operation of filter cartridges becomes somewhat similar to that of cloth bag filters. Unfortunately, in multi cartridge dust collectors, the reverse pulse air velocity is considerably lower requiring a reduced air to cloth ratio, usually less than 2:1

SUMMARY OF THE INVENTION

The present cyclonic dust collector is contained within a housing having a substantially horizontal dusty air inlet and a downwardly directed dust outlet extending substantially normal to the inlet and connected thereto by means of a target wall which begins in a horizontal plane and arcs downwardly in a smooth curve becoming substantially vertical toward the dust outlet A filtering assembly is mounted about the axis of this curved outer wall and an air outlet is formed in a side wall of the housing in the vicinity of the axis. A substantially cylindrical inner curved wall is mounted within the housing substantially coaxial around the filter assembly and, together with the outer wall, forms a cyclone chamber. This inner wall has a venturi slot directed down stream and formed between 15° and 45° from the vertical on the down stream side. An entry opening is formed in the inner wall further downstream, between 90° and 120° from the vertical and extends approximately half,way across the dust outlet opening The filter assembly is formed by a pleated sleeve of filter material mounted on a cylindrical frame fixed in the housing. An entry wall is spaced inwardly from and generally parallel to the outer target wall until it tangentially meets the inner cylindrical wall before the venturi slot The cyclone chamber formed between the outer and inner walls forms a channel which focuses the incoming dusty air toward the downwardly curved or target portion of the outer wall. The high centrifugal force achieved by the dusty air stream in this channel causes the light airborne dust particles to impinge on the curved inner surface of the outer wall, where their velocity causes them to be directed downward, along with the force of gravity, toward the dust outlet The bottom edge of the inner wall forms an opening into an inner filtering chamber, allowing the air to be drawn around and through the cylindrical filter assembly to the clean air outlet. The sub micron dust remaining in the air after the cyclonic passage is filtered by the filter cartridge with substantially clean air exiting transversely through the clean air outlet.

As the dust accumulates on the surface of the filter cartridge, it is removed by periodic pulses of compressed air flowing in a reverse direction through the filter material. A series of diffusers are mounted on a circular plenum that forms the filter assembly base and clean air outlet. A series of fast response diaphragm valves are positioned so that a pulse of compressed air is sequentially released into the plenum and thence into selected diffusers. The volume and pressure of the compressed air, or gas, causes the internal pressure of the diffuser to rise above 15 psi. The diffuser surface facing the inner, and cleaner, side of the filter cartridge is porous. When the pressure rises above one (1) atmosphere, the air/gas released reaches sonic velocity, moving toward and through the filter media As this pulse of air/gas moves opposite to the flow of dusty air, a sharp reverse motion forces the dust accumulated on the outer surface of the filter outwardly from the filter surface. This dust is reentrained in the incoming air flow, and travels outward by centrifugal force, regaining the cyclonic chamber via the venturi, to be released into the dust discharge.

The centrifugal forces developed by the curved wall redirect the flow of the air thereby increasing particle mass many times the normal gravity state. This effective increase in mass drives the particles against the wall surface where the particles are securely impinged and the forward velocity, combined with gravitational forces, cause the particles to move toward the dust collecting outlet at high speed. The residual kinetic energy propels the dust particles out of the air stream into the solids' outlet zone. The filter assembly is provided with air pressure control means whereby normally there is a pressure differential drawing air and dust from the air stream into the filter

BRIEF DESCRIPTION OF THE DRAWINGS

The present invention will now be described, by way of example, with reference to the accompanying drawings, in which.

DETAILED DESCRIPTION OF AN EMBODIMENT OF THE INVENTION

Figure 3:
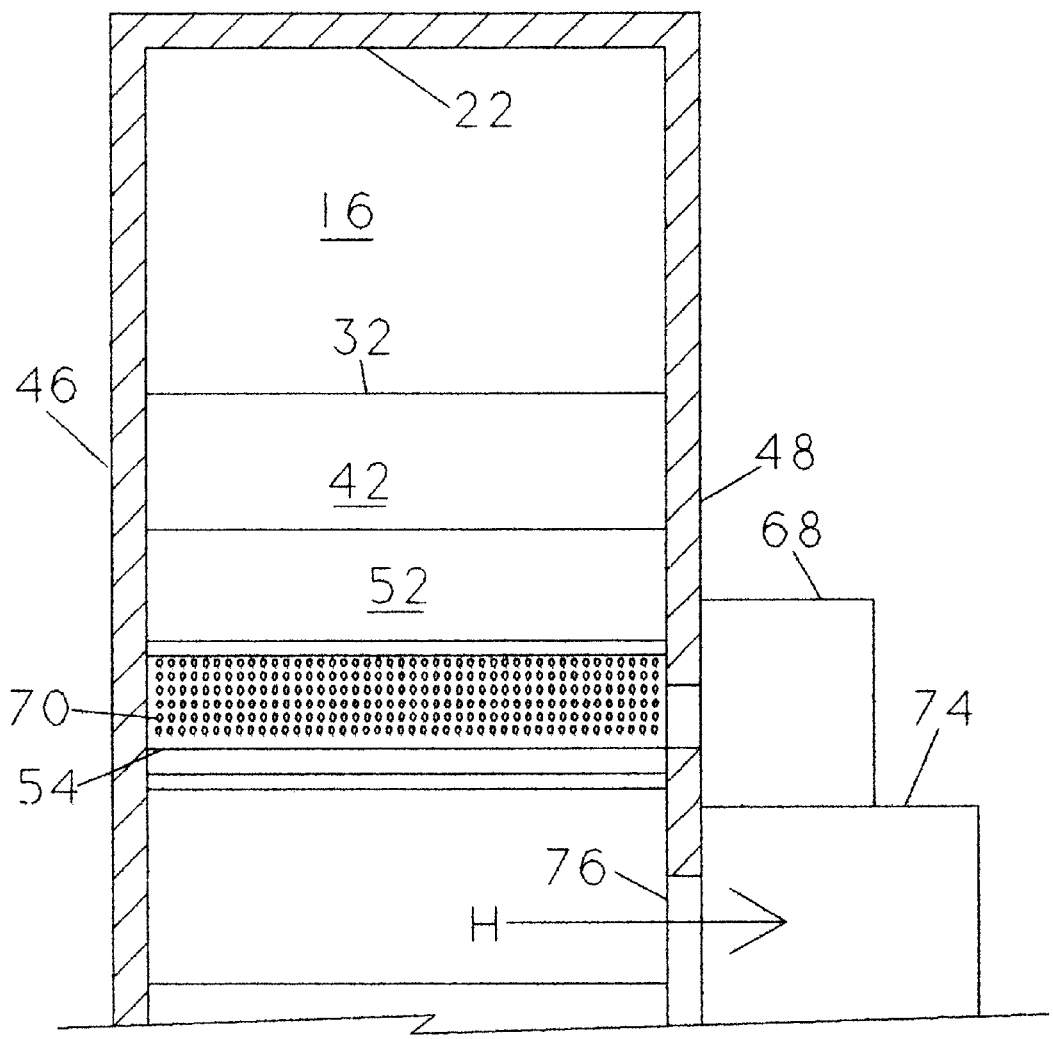
FIG. 3 is a transverse section taken along line 3—3 of FIG. 2.

Turning now to the figures, the subject cyclonic dust collector 10 is formed by a housing 12 defining a cyclone chamber 14 having a substantially horizontal inlet 16 and a substantially vertical dust outlet 18. The chamber 14 is formed by outer wall 20 which comprises a horizontal section 22, a vertical section 24, and an intermediate smooth curved surface of transition 26 extending about 90°, in the down stream direction from the vertical, about an axis 28. The inner wall 30 of the chamber 14 has a horizontal portion 32 connected tangentially to a partial cylindrical inner wall 34 extending about 120°, in the down stream direction from the vertical, about axis 28 to an edge 36. The inner wall 34 is broken by a reflux venturi slot 38 and an intake wall 40. The reflux venturi slot 38 is formed by a tangential plate 42 overlying and spaced from a lip 44. The reflux venturi slot 38 is preferably located between 15° and 45° from the vertical in the down stream direction. The intake wall 40 starts from about the bottom vertical, on the inner wall 30, and extends upwardly in an expanding curve in a counter flow direction to a point more than halfway across the dust outlet 18 and above the edge 36. The housing 12 is completed by side walls 46, 48 (FIG. 3), at least one of which is detachable to provide access to chamber 14. Mounted coaxially about axis 28 and within the chamber 14 is a dust collection filter assembly 50 comprising a cylindrical filter sleeve 52 received on a cage assembly 54 secured to the housing 12 with its axis normal to the air flow. A uniformly spaced array of diffusers 56, 58, 60, 62, 64, 66 is mounted on the cage assembly 54. Each diffuser (see FIG. 3) is connected to a plenum 68, which in turn is connected by valves (not shown) to a source of pressurized air (also not shown but preferable plant air). Each diffuser is provided with a plurality of openings 70 directed to the adjacent inner surface of the filter sleeve 52. The dust outlet 18 is shown connected to a rotary airlock 72 of known design, although any suitable dust collector may be used. A blower means 74 is connected to the air outlet 76 in the side wall 48 of the housing 12.

The subject dust collector utilizes the centrifugal forces developed in the cyclone chamber to cause the dust particles (here represented by a series of out-of-scale squares 78) to impinge on the curved wall 26. Dusty air enters the horizontal section (arrow A) at velocities ranging from 2,500 to 5,500-fpm. The centrifugal force developed by the curved wall 26 will increase the effective mass of each particle 78 many times its normal gravity state. This causes all the particles to move (arrow B) toward the surface of the curved wall 26 where the heavier particles 78 are securely impinged losing a portion of their forward velocity causing them, along with the influence of gravity, to pass toward the dust outlet 18 (arrow C). The air, freed from the heavier particles 78, forms a turbulent vortex (with a clockwise motion as shown, arrow D) which reentrains at least some of the dust particles which had impinged against the outer wall 26. At least a portion of the dusty air, from which the heavier particles have just been removed, is diverted by the intake wall 40 to swirl around the filter cartridge 52 where the dusty air strikes the filter media tangentially. Most of the now dust free air (arrow E) will be drawn through the filter cartridge 52 by blower means 74. However, some of the air (arrow F) will continue a clockwise path (as shown) to exit the venturi slot 38 (arrow G) back into the main air stream. The residual dust particles 78 are filtered out by the filter media 52 and cleaned air is drawn through a port 76 (arrow H, FIG. 3) by blower 74. The air striking the pleated filter tangentially will tend to swirl (arrow I) preventing dust from settling at the bottoms of the V-shaped pleats. Periodically, pulses of air will be blasted through the diffusers and filter (arrow J) to remove residual dust from the outside of the filter. The dust reentrained by the swirling action (arrow I) and reverse pulses (arrow J) will be drawn through the venturi 38 and again impinge the curved outer wall 26 to be deflected to the dust outlet.

The fluid dynamics embodied by this invention depend upon the curved wall surface to ensure good separation of the dust from the air stream. The resultant erosion of the surface of the curved wall will be dependent upon the abrasive nature of the dust entrained in the air as well as the material of the curved wall itself. Traditional erosion prevention methods, such as wear plates or hard coated surfaces (neither of which has been shown), can be employed to advantage in reducing the erosion problem.

The collected dust will coat the outside of the filter cartridge 52 at a rate dependent upon the amount of dust per volume of air and the velocity of the air. The separation efficiency will be calculated to be dependent upon the rate of dust drawn through the unit, but theoretically should be:

Primary separation: 98% of the total dust load by encountering wall 26;

Secondary separation: 99% of the residual dust load (99% of 2%) in the recirculated air;

Tertiary separation: by the filter cartridge filtering 100% of the dust above 20 microns.

The preferred cartridge design is, in section and as shown, configured to form a series of wide, deep, Vee shaped pleats 80 which have sufficient structural strength to obviate the need for reinforcing in order to form a rigid cartridge 52. As the air travels across the tip 82 of each pleat 80, a partial vacuum is formed on the downstream side of the respective pleat This results in the creation of a vortex (arrow I, FIG. 2) within each Vee shaped pleat, which vortex scours the dust from the bottom of the Vee and reentrains it into the air strearyl This constant scouring effect sharply decreases the surface dust load on the filter cartridge 52, thereby extending the service life and the required maintenance interval.

Figure 1:
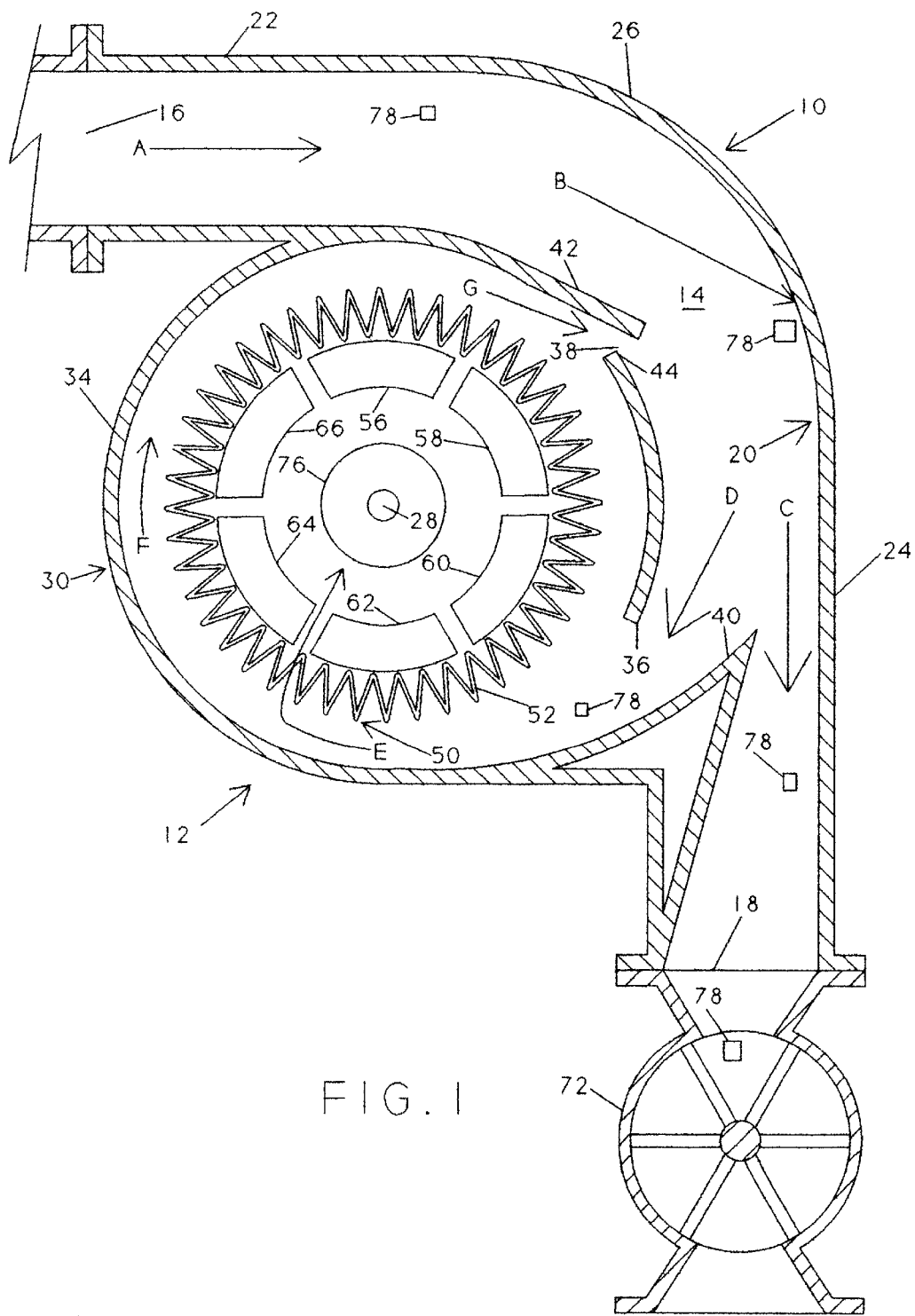
FIG. 1 is a vertical section through an embodiment of the present invention in a normal operating condition.
Figure 2:
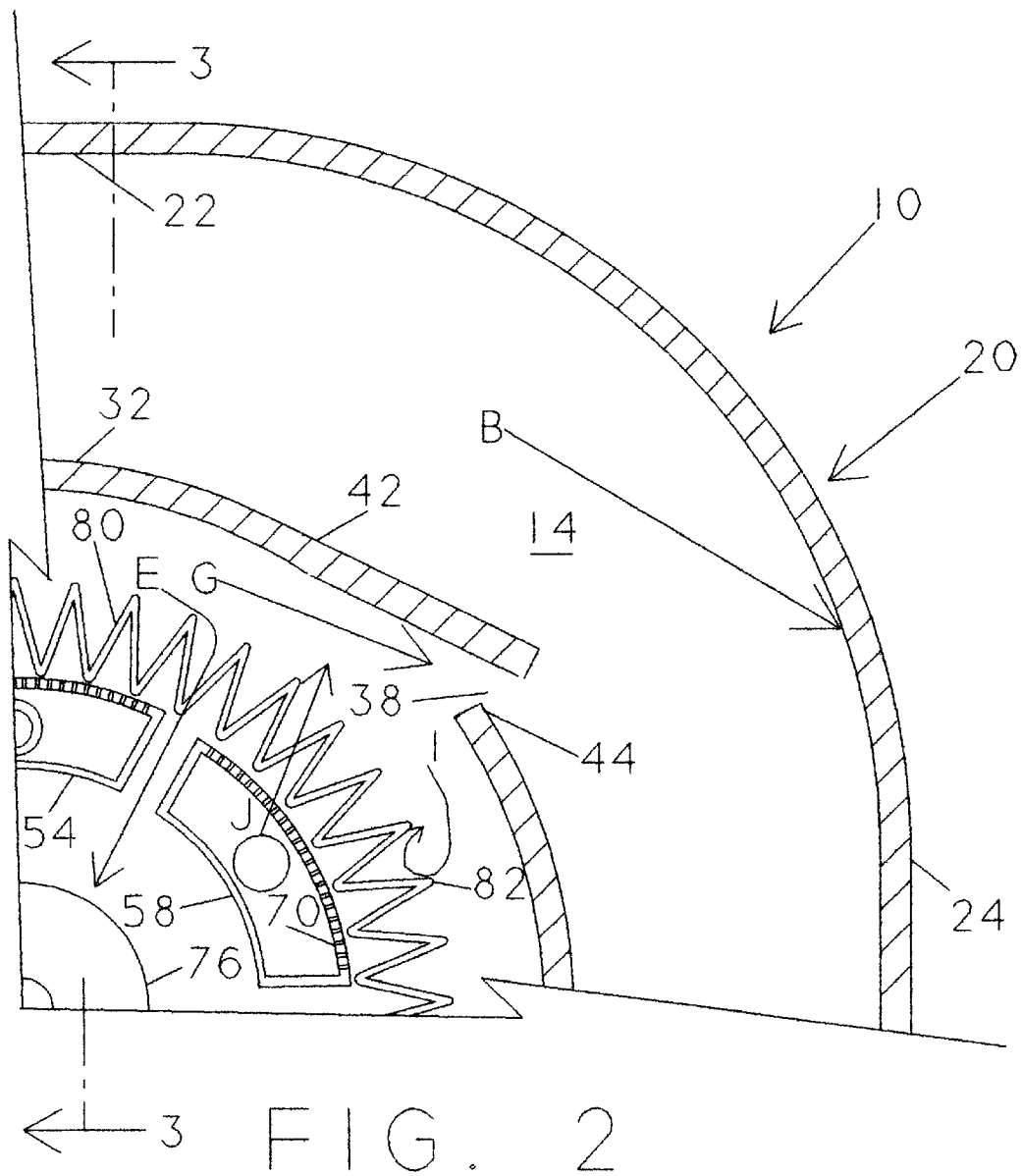
FIG. 2 is an enlarged detail vertical section showing the venturi slot and a portion of the filter assembly.

Ultimately the dust accumulation within the pleats of the filter cartridge will increase to such extent that the resistance of the filter to the passage of air will require servicing of the filter. Therefore it is extremely desirable to have a filter cartridge which is self-cleaning. Electronic sensors (not shown) determine changes in air flow resistance and initiate the start of the self-cleaning process. This process is accomplished by the series of diffusers 56, 58, 60, 62, 64, 66 located on the inner side of the filter cartridge 52 and positioned to face outwardly toward the filter's inner surface. The diffusers are each connected to a plenum 68 containing clean high pressure air, preferably plant compressed air. A series of diaphragm style valves (not shown) periodically and/or sequentially release bursts of compressed air to pass through the respective diffusers outwardly toward the inner side of the filter cartridge 52 blowing the collected dust from the outer surfaces of the Vee folds back into the air stream. This reverse air pulse dislodges the dust coating the filter and causing the dust to reentrain onto the incoming air stream on downstream portion. Reentraining of the dust laden air from the filter cartridge is accomplished via the reflux venturi slot 38 in the inner wall surface, as shown in FIGS. 1 and 2. The high velocity air stream in the primary separation zone, where the dust laden air meets the back wall, produces a partial vacuum which will draw the dust laden air stream out of the venturi slot thereby helping the filter cartridge 52 to clean itself The dust is refluxed with the incoming stream. A major advantage of this system is that the filter can be regenerated without interrupting the operation of the apparatus.

The preferred dust filter 52 for the subject system is a cartridge style filter with a high efficiency air cloth ratio, between 50:1 and 150:1. Traditional dust collectors are identified by the amount of cloth filter area in relation to the dusty air volume. For example, a filter that will clean 5 cu. ft. of air for every square foot of filter surface would have a ratio of 5:1. The most popular styles incorporate vertical filter bags designed to collect dust on the bag's outer surface. The dust is removed from the bag by a pulse jet of compressed air injected into the bag. This pulse creates a temporary reverse flow through the cloth to drive the dust from the outer surface of the bag. The dust falls, by gravity, into a hopper located in the bottom of the housing.

The present invention is an improved solution to the problem of removing dust from a filter. First, the reverse pulse velocity is increased by placing an air diffuser closely adjacent the inner, and cleaner, side of the filter media to focus this reverse flush pulse directly on the media Secondly, isolated segments of the cartridge are sequentially treated so that only a small portion of the filter cartridge is undergoing the reverse pulse action at any given time. This insures high velocity flow to throughly clean the isolated filter media. Third, the above described means for reentraining the dust from the filter prevents the dust from merely resettling into another pleat of the filter. This unique design produces a high ratio dust collector capable of handling dusty air volumes ranging from 300 to more than 5,000 cfm in a compact housing. Thus there are savings in both capital equipment and maintenance costs.

An air reservoir (not shown ) having a sufficient volume of pressurized air for high performance cleaning is connected to the subject apparatus through a pressure regulator to control the air pressure at 80 psig minimum. Conventional filter means (also not shown) are included to insure that the supplied air is clean. Manifold 68 provides the individual connections for the diaphragm pulse valves (not shown) associated with each diffuser. The pulse valves are controlled by pilot valve or the timer system (not shown) which controls both the duration and interval of the pulse and is fully adjustable.

When actuated, the pulse duration will preferably be in the range of 0.1 to 0.5 seconds. This will open the pilot valve which in turn opens the respective diffuser diaphragm valve. A surge of compressed air will flow through the diffuser resulting in a rapid pressure rise causing a flow of high velocity air to be directed toward the clean side of the cartridge forcing any impinged layer of dust to be ejected into the tangential air stream (arrow J). Centrifugal force will press the dust toward the curved surface of the cyclonic housing which will result in the dust from the filter being delivered to the rotary airlock outlet 74 and discharged to a dust removal container (not shown).

A polyester cartridge has been found to have very good recovery and life in the present invention. Starting with a clean filter at 4"WC at full air volume and initiating a cleaning cycle at 6"WC, the pleats have been observed, when almost completely filled with dust at 6"WC to be quickly flushed with the first few pulses. This high performance is a result of the high face velocity of the filter media, due to the small surface area which increases the velocity during the reverse pulse cycle.

The preferred wide pleat cartridge design has been found to permit quick dust ejection with the reverse pulse operation. Also, a generous distance between pleats, as previously described, causes a desirable vortexing action to clean the pleat pocket. This cyclonic air passing across the tip of the pleat at high velocity effectively sweeps the dust from the pleats before it has a chance to accumulate to any degree.

There are certain concerns about using fabric filters when handling PET type dust and streamers. The jagged physical nature of streamers tends to lock on the fabric of the filter and not respond to the freeing action of the reverse pulse. This is true of fabric filters in all applications. However, the scoring action of the pleated filter together with the periodic reverse pulsed air should serve to lessen this problem in the present invention.

Paper cartridges may be used for light duty applications where the dust is relatively light and will release easily. These are the least costly filters but have the irritating characteristic of loading the pleats with dust which compacts and requires periodic manual cleaning, the frequency of which, in the worst case, can be as short as every two hours. The great advantage of paper filter cartridges is their large surface area results in lower pressure drops. This style cartridge is commonly used in many cartridge style dust collectors, especially when high maintenance costs, due to the frequent requirement for change, are not a factor The VYON cartridge (a trade name product of the Atlas Co. of Mertztown, Pa.) has fewer but deeper pleats than the above mentioned polyester cartridge. Its porosity is not the same and will allow higher air face velocity with a higher pressure drop. Its operating characteristics indicate that it will clean more easily than other similar filters. Its best feature is the surface texture, which is very smooth thereby releasing dust easily. Despite the coarse porosity and high resistance, this cartridge outperforms the rest in long term applications.

Similar in configuration to the polyester-felt cartridge is the treated polyester cartridge. The primary difference is the polyester filtering media is saturated with Teflon. The purpose of this is to reduce the porosity of the media and trap lower micron dust particles. Caution should be observed in selecting this media because the air resistance is greater resulting in a tendency to blind. When this style is selected, the filtering area must be increased by a factor of two. In other words, a 1,200 CFM SPC would normally be an SPC-200 and should be SPC-400 wvhen treated polyester is selected.

Dust collecting on the cartridge's surface increases pressure loss until it results in tripping a switch to energize a reverse pulse timer. In some instances, the pressure switch could be replaced by an amperage switch which monitors the exhaust fan motor amperage. As the resistance increases, caused by the dust build up on the filter cartridge, the motor amperage becomes lower. At a preset point, the amperage switch will close, energizing a service filter alarm and the sequential reverse pulse. The pulse timer sequences bursts of air through diffuser segments until the pressure loss through the cartridge returns to a "clean" level setting and the timer is deenergized The inlet of the subject apparatus is distinguished from conventional dust collectors by the addition of a partition which channels the air stream across the top of the filter assembly, in the manner of an over-shoot water wheel, and down toward the dust outlet. This results in an improved separation of fine dust particles. Also the particles are released from the air stream at the point where they are directed toward the solids outlet. The kinetic energy in the particles maintains the flow into the dust outlet and away from the filter.

The diffuser design has been improved to incorporate a more uniform burst of reverse pulse air. The face of the diffusers are made of perforated metal providing 60% open area. The pulse air rapidly passes through the diffuser chamber expanding rapidly, the perforations resistance to the flow causing the pressure to quickly rise to more than 15.0 psig. This results in the pulse speed reaching sonic velocity. The air pulse is directed toward the cleaner inner side of the filter cartridge and passes through the filter media blasting the coating dust outward. The size of the diffusers, their number and relative spacing determine the focus of the back pulse on smaller filter areas. This has resulted in much higher performance with difficult dusts.

As the dust accumulates on the filter surface, it is removed by periodic pulses of compressed air flowing in a reverse direction through the filter cloth. A series of diffusers are mounted on a circular plenum that forms the filter cartridge base and clean air outlet. The diffusers are threaded to facilitate manufacturing. A series of fast response diaphragm valves are positioned so that a pulse of compressed air is released into the plenum, and thence into at least one of the diffusers. The quantity and pressure of the compressed air, or gas, causes the internal pressure of the diffuser to rise above 15 psi. The diffuser surface facing the clean side of the filter cartridge is porous. When the pressure rises above one (1) atmosphere, the airless released reaches sonic velocity, moving toward and through the filter media As the pulse air/gas is moving opposite to the dusty gas, a sharp reverse motion forces the accumulated dust from the filter surface. This dust is reentrained in the incoming air flow, and travels outward by centrifugal force, to be released into the dust discharge. It is within the purview of the invention to sequence the diffusers, one after another, to stagger activation, to activate in pairs or groups, or in many other suitable configurations.

In an alternate embodiment the venturi plate 42 could be made movable and provided with pressure sensitive control means to vary the size of the venturi opening in response to pressure variations within the chamber. A similar arrangement could also be placed at the inlet to assure adequate velocity of the incoming dusty air.

Each pulse is timed to clean only a portion of the filter surface, so that the air filtering system is not interrupted, which could occur if the total pressure of the reverse pulse air exceeded that of the incoming air. Such an occurrence could result in the unwanted discharge of the dusty air back to its source and into the environment. The diffusers increase in number the larger the diameter of the cyclonic dust collector. The pulse controls the back flush, which is timed to function sequentially at intervals of five (5) to ninety (90) seconds each. The pulse is adjustable from 0.1 to 0.5 seconds.

As an further alternative to the above described embodiment, the filter assembly could be made rotatable about its axis and the diffusers arranged to be sequentially actuated upon reaching a certain spot in the rotation, such as immediately prior to reaching the vertical. Such an embodiment could be further modified by reducing the number of diffusers and making them stationary within the rotating filter assembly. The ultimate of this embodiment would be a single diffuser located near the vertical and before the venturi slot with the filter rotating over the diffuser and having sections of the filter periodically subjected to the back pulse cleaning. In each of these alternate embodiments the diffusers would still be connected to be periodically activated with blasts of air to remove the accumulated dust and debris from the outer surface of the filter. Other combinations of diffusers and pulsing may occur to those skilled in the art The present invention may be subject to many modifications and changes without departing from the spirit or essential characteristics thereof The described embodiment should therefore be considered in all respects as being illustrative and not restrictive of the scope of the invention as defined by the appended claims.

I claim:

1. A cyclonic dust collector for removing dust from dust laden air comprising:

a housing defining a closed air treatment chamber and having an outer wall defining a continuous curve from a dusty air inlet to a dust outlet and a substantially cylindrical inner wall coaxial with said curved outer wall and broken by a venturi reflux slot and an inlet opening adjacent said dust outlet, and a clean air outlet in the vicinity of said axis, said axis extending transversely to the flow of air through said chamber;

a filter assembly mounted in said housing with its axis substantially normal to the air flow and coaxial within said inner wall, said filter assembly having a sleeve of filter material and a plurality of diffusers mounted within said sleeve directed toward said filter material; and valve means connected between each said diffuser and a source of pressurized air whereby pressurized air is periodically caused to flow back through said filter in pulses blowing the dust therefrom to be reentrained in the circulating air.

2. The cyclonic dust collector according to claim 1 wherein said diffusers increase in number the larger the diameter of the housing cyclonic dust collector.

3. The cyclonic dust collector according to claim 1 wherein said pulses are timed to function sequentially at intervals of five (5) to ninety (90) seconds each.

4. The cyclonic dust collector according to claim 1 wherein said pulse is adjustable from 0.1 to 0.5 seconds.

5. The cyclonic dust collector according to claim 1 further comprising airlock means at said dust outlet.

6. The cyclonic dust collector according to claim 1 further comprising blower means connected to said clean air outlet.

7. The cyclonic dust collector according to claim 6 further comprising means responsive to said blower means controlling actuation of said diffusers.

8. The cyclonic dust collector according to claim 1 further comprising pressure responsive means controlling actuation of said diffusers.

9. The dust collector according to claim 6 wherein said diffusers increase in number the larger the diameter of the housing.

10. The dust collector according to claim 6 wherein said pulses are timed to function sequentially at intervals of five (5) to ninety (90) seconds each.

11. The dust collector according to claim 6 wherein each said pulse is adjustable from 0.1 to 0.5 seconds.

12. The dust collector according to claim 6 further comprising airlock means at said dust outlet.

13. The dust collector according to claim 6 further comprising blower means connected to said clean air outlet.

14. The dust collector according to claim 13 further comprising means responsive to said blower means controlling actuation of said diffusers.

15. The dust collector according to claim 6 further comprising pressure responsive means controlling actuation of said diffusers.

16. The dust collector according to claim 6 further comprising:
    means to remove the dust accumulated on the outer surface of the filter by periodic pulses of compressed air flowing in a reverse direction outwardly through the filter.

17. The dust collector according to claim 6 further comprising a plurality of diffusers mounted on a circular plenum that forms a filter assembly base and a clean air outlet.

18. The dust collector according to claim 6 further comprising a series of fast response diaphragm valves positioned so that a pulse of compressed air is released into a plenum and thence into selected diffusers, the volume and pressure of the compressed air causing the internal pressure of the diffuser to rise above predetermined amount so that the air released reaches sonic velocity, moving toward and through the filter media whereby the pulsed air forces the accumulated dust outwardly from the filter surface to be reentrained in the incoming air flow, and travels outward by centrifugal force, to be released into the dust discharge.

19. An apparatus for removing dust from dust laden air, comprising:
    a housing defining an air flow path from an inlet for the dust laden air to a first outlet for dust free air and an second outlet for the collected dust, said housing having a target wall forming a smooth surface of transition between said inlet and said second outlet, the axis of said surface of transition extending transversely to said air flow path, said first outlet being located in the vicinity of the axis of said surface of transition;
    a cylindrical filter assembly mounted in said housing about said axis;
    inner wall means at least partially enclosing said filter assembly and defining a cyclonic flow channel with said outer wall and extending from said inlet to almost said second outlet to separate said incoming flow of dusty air from said filter assembly;
    air flow directing wall means adjacent said second outlet directing air flow directing air to strike said filter assembly tangentially;
    a venturi slot formed in said inner wall means directed away from said inlet; and
    diffuser means mounted within said filter sleeve and connected to a source of pressurized air to periodically cause pulses of reverse air flow through said filter whereby dust coating said filter will be reentrained in the air flow.

20. The apparatus according to claim 19 wherein said diffuser means increase in number the larger the diameter of the cyclonic dust collector.

21. The apparatus according to claim 19 wherein said pulses of air from said diffuser means are timed to function sequentially at intervals of five (5) to ninety (90) seconds each.

22. The apparatus according to claim 19 wherein said pulses of air from said diffuser means are adjustable from 0.1 to 0.5 seconds.

23. The apparatus according to claim 19 further comprising pressure responsive means controlling actuation of said diffuser means.

24. The apparatus according to claim 19 wherein said first outlet is provided with an airlock.

25. The apparatus according to claim 19 further comprising blower means connected to said first outlet.

26. An improved dust collector for removing substantially all of the dust from dust laden air, said dust collector comprising:
    a housing having a substantially horizontal dusty air inlet and a downwardly directed dust outlet extending substantially normal to the dusty air inlet, a target wall substantially opposite said dusty air inlet and beginning in a horizontal plane towards said dusty air inlet and arcing downwardly in a smooth curve toward the dust outlet;
    a filtering assembly located at the axis of said curve and formed by a sleeve of filter material of sufficient rigidity to be self supporting and at least one diffuser mounted within said sleeve with a perforated surface closely adjacent said sleeve, said diffuser connected to a pressurized source of air whereby bursts of air can be periodically directed outward through said filter material;
    an entry wall spaced inwardly from and generally equally spaced from the outer target wall and connecting an inner substantially cylindrical wall about a vertical center line, said entry wall ending slightly below a horizontal center line;
    the space between the outer and inner walls forming a cyclonic channel focusing the incoming dusty air toward the downwardly curved target wall where high centrifugal forces cause light airborne dust particles to impinge on the curved inner surface of the target wall and to be directed downwardly toward the dust outlet opening;
    the bottom edge of the inner wall forming an opening to the filtering assembly allowing the air to be drawn around the cylindrical filter assembly and radially inwardly therethrough whereby the sub micron dust remaining in the air is filtered by the cylindrical filter with clean air exiting through an opening within the filter assembly.

27. A method for removing dust from dust laden air, comprising the steps of:
    providing a housing defining a chamber having an inlet for the dust laden air, an outlet for dust free air, and an outlet to the collected dust, a filter cartridge assembly mounted in said chamber transverse to the flow of air therethrough, said outlet for the dust free air being located at the axis of said filter cartridge assembly, and means for causing bursts of reverse flow air through the filter whereby dust lodged therein will be reentrained in the flowing air and carried to the dust outlet;
    directing high velocity air flow into said chamber wherein at least some of the dust will strike the chamber wall at high velocity causing high centrifugal force and detraining said dust from the air whereby the dust will fall under the force of gravity from the air stream and be removed from said chamber through an air lock while said dust free air is drawn radially through said filter cartridge assembly and out through said dust free air outlet.

28. The method according to claim 27 wherein said pulses are timed to function sequentially at intervals of five (5) to ninety (90) seconds each.

29. The method according to claim 27 wherein each said pulse is adjustable from 0.1 to 0.5 seconds.

30. The method according to claim 27 further comprising providing airlock means at said dust outlet.

31. The method according to claim 27 further comprising providing blower means connected to said clean air outlet.

32. The method according to claim 31 further comprising providing means responsive to said blower means controlling actuation of said diffusers.

33. The method according to claim 27 further comprising providing pressure responsive means controlling actuation of said diffusers.

34. A method for removing dust from dust laden air comprising the steps of:

provinding a closed chamber having a dusty air inlet, a dust outlet, and a target wall opposite the dusty air inlet having a smooth curved surface from said dusty air inlet to said dust outlet, a cylindrically filter assembly mounted in said chamber coaxially with said curved surface, an inner wall uniformly spaced from said outer wall and extending from said dusty air inlet to near said dust outlet and spaced coaxially around said filter assembly, a transverse clean air outlet within said filter assembly, said filter assembly having a filter cartridge mounted thereon and a uniformly spaced array of diffusers mounted therein, each diffuser having a plurality of orifices directed toward the adjacent filter and being connected to a source of pressurized air by valve means;

admitting dust laden air through said inlet to impinge upon said curved wall with at least some of the dust dropping out of the air to fall to said exit;

the remainder of said air flowing around said filter assembly to be drawn therethrough to be expelled from the transverse clean air outlet as clean air;

periodically pulsing said diffusers to send high velocity air back through said filter cartridge driving dust deposited thereon back into the air stream to eventually be removed through said dust exit, whereby particles entering said apparatus are forced out of the air stream by centrifugal force against the back outer curved surface, the solids striking said wall retaining at least some of their kinetic energy which separates them from the air stream, particle velocity remaining high as the solids enter the dust outlet.

35. The method according to claim 34 further comprising providing an air lock at said dust outlet.

36. The method according to claim 34 further comprising providing blower means connected to said clean air outlet.

37. The method according to claim 34 further comprising providing means responsive to said blower means controlling actuation of said diffusers.

38. The method according to claim 34 further comprising providing pressure responsive means controlling actuation of said diffusers.

39. A cyclonic dust collector for removing substantially all particles from dust laden air comprising:

a housing having a substantially horizontal dusty air inlet and a downwardly directed dust outlet extending substantially normal to the inlet and connected thereto by means of a target wall which begins in a horizontal plane and arcs downwardly in a smooth curve becoming substantially vertical toward the dust outlet;

a filtering assembly mounted about the axis of said curved outer wall and an air outlet in a side wall of the housing in the vicinity of the axis, said filter assembly having a sleeve of filter material mounted about a plurality of diffusers in a cylindrical configuration fixed in the housing and connected to a source of pressurized air;

a substantially cylindrical inner curved wall substantially coaxial with the filter assembly and, together with the outer wall, forming a cyclone passage;

a venturi slot directed down stream and formed in said inner wall between 15° and 45° from the vertical on the down stream side;

an entry opening formed in the inner wall further downstream, between 90° and 120° from the vertical and extending at least half way across the dust outlet opening;

an entry wall spaced inwardly from and generally parallel to the outer target wall until it tangentially meets the inner cylindrical wall before the venturi slot;

the cyclone passage formed between the outer and inner walls focusing incoming dusty air toward the downwardly curved or target portion of the outer wall, the high centrifugal force achieved by the dusty air stream in this passage causing the light airborne dust particles to impinge on the curved inner surface of the outer wall, where their velocity causes them to be directed downward, along with the force of gravity, toward the dust outlet;

the bottom edge of the inner wall forming an opening into the inner filtering chamber, allowing the air to be drawn around and through the cylindrical filter assembly to the clean air outlet;

the sub micron dust remaining in the air after the cyclonic passage is filtered by the filter cartridge with substantially clean air exiting transversely through the clean air outlet; and whereby as the dust accumulates on the surface of the filter cartridge, it is removed by periodic pulses of compressed air flowing in a reverse direction from said diffusers through the filter material.

40. A cyclonic dust collector according to claim 39 wherein said diffusers are mounted on a circular plenum that forms a base for the filter assembly base and clean air outlet.

41. A cyclonic dust collector according to claim 39 further comprising a series of fast response diaphragm valves positioned so that a pulse of compressed air is sequentially released into the plenum and thence into selected diffusers.

42. A cyclonic dust collector according to claim 39 wherein the volume and pressure of the compressed air, or gas, causes the internal pressure of the diffuser to rise above 15 psi.

43. A cyclonic dust collector according to claim 39 wherein said diffusers are facing the clean side of the filter cartridge is porous.

44. A cyclonic dust collector according to claim 39 wherein, when the pressure rises above one (1) atmosphere, the air/gas released reaches sonic velocity, moving toward and through the filter media.

45. A cyclonic dust collector according to claim 44 wherein as said pulse of air/gas moves opposite to the flow of dusty air, a sharp reverse motion forces the dust accumulated on the outer surface of the filter outwardly from the filter surface and this dust is reentrained in the incoming air flow, and travels outward by centrifugal force, to be released into the dust outlet.

46. A cyclonic dust collector according to claim 39 wherein said centrifugal forces developed by the curved wall redirect the flow of the air and thereby increase particle mass many times its normal gravity state, whereby this effective increase in mass drives the particles against the wall surface, where the particles are securely impinged and, the forward velocity combined with gravitational forces causes the particles to move toward the dust outlet with the residual kinetic energy propelling the dust particles out of the air stream into the dust outlet.

47. A cyclonic dust collector according to claim 39 further comprising air pressure control means whereby normally there is a pressure differential drawing air and dust from the air stream into the filter.

48. The cyclonic dust collector according to claim 39 further comprising airlock means at said dust outlet.

49. The cyclonic dust collector according to claim 39 further comprising blower means connected to said clean air outlet.

50. The cyclonic dust collector according to claim 49 further comprising means responsive to said blower means controlling actuation of said diffusers.

51. The cyclonic dust collector according to claim 39 further comprising pressure responsive means controlling actuation of said diffusers.

52. The cyclonic dust collector according to claim 39 wherein said filter sleeve is pleated.

* * * * *